United States Patent [19]

Noguchi

[11] Patent Number: 4,546,839
[45] Date of Patent: Oct. 15, 1985

[54] RACK AND PINION STEERING GEAR MOUNTING SYSTEM

[75] Inventor: Hiroshi Noguchi, Tochigi, Japan

[73] Assignee: Nissan Motor Co., Ltd., Japan

[21] Appl. No.: 616,802

[22] Filed: Jun. 4, 1984

[30] Foreign Application Priority Data

Jul. 29, 1983 [JP] Japan .......................... 58-119070[U]

[51] Int. Cl.$^4$ ............................................. B62D 5/06
[52] U.S. Cl. .................................. 180/142; 180/143; 180/148
[58] Field of Search ....................... 180/143, 142, 148

[56] References Cited

U.S. PATENT DOCUMENTS 3,882,954  5/1975  Inoue ................................. 180/143
4,481,866  11/1984  Matouka ............................. 180/148

FOREIGN PATENT DOCUMENTS 138239  10/1979  Japan ................................... 180/143

Primary Examiner—William E. Wayner
Attorney, Agent, or Firm—Leydig, Voit & Mayer

[57] ABSTRACT

A gear housing is prevented from longitudinal movement by variable-resilience stopper means which are rotatable to have, with respect to a force of the same magnitude, a variable resilience or rigidity depending upon varying angular position of the stopper means. The angular position of the stopper means is controlled by driving means in such a manner that the stopper means have a minimum resilience or maximum rigidity upon vehicle low-speed running conditions and a maximum resilience or minimum rigidity upon vehicle high-speed running conditions.

10 Claims, 15 Drawing Figures

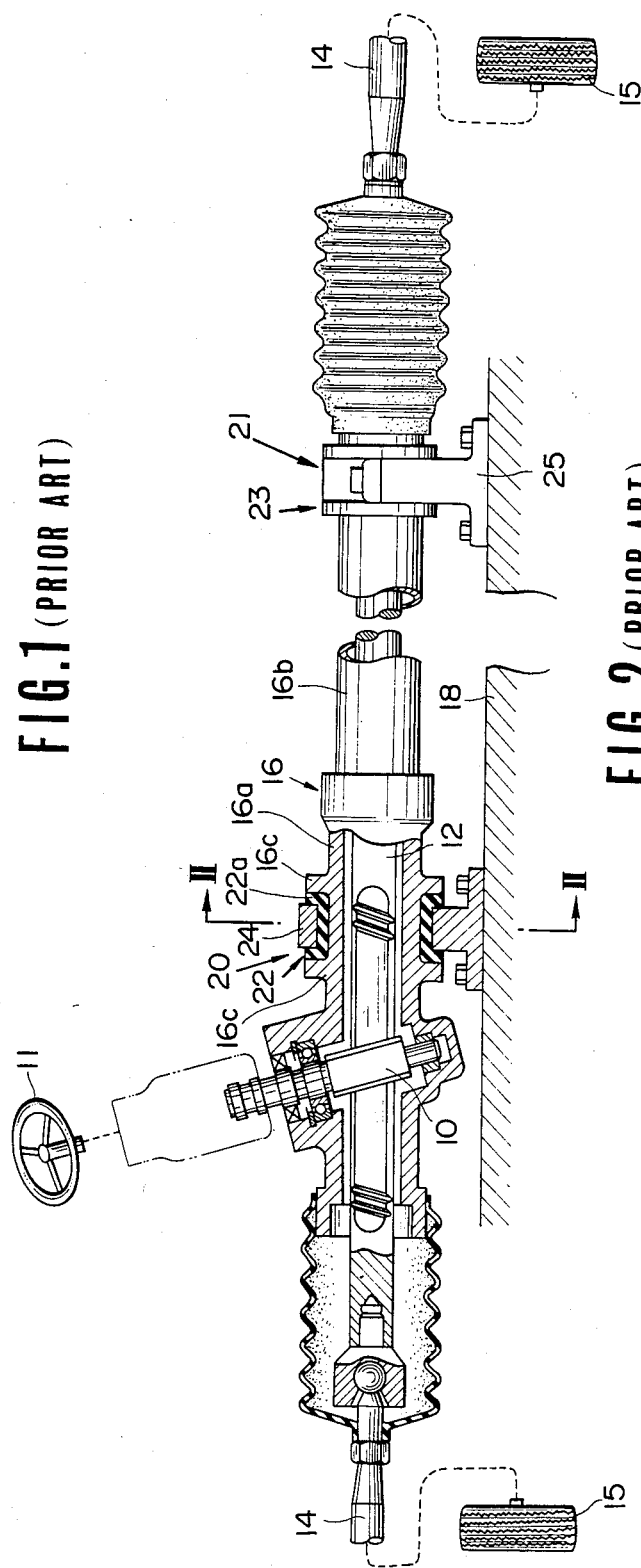
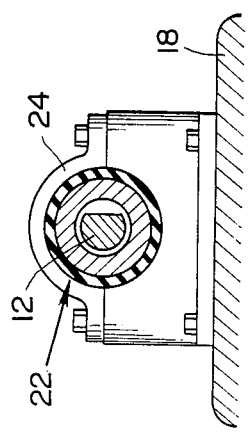
FIG. 1 (PRIOR ART)
FIG. 2 (PRIOR ART)

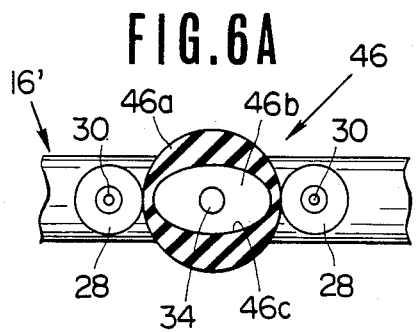
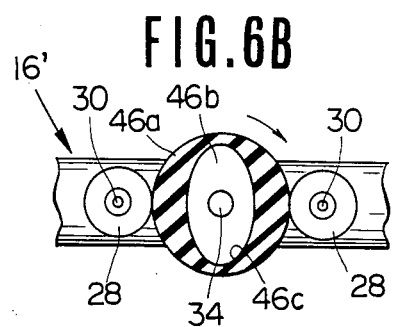
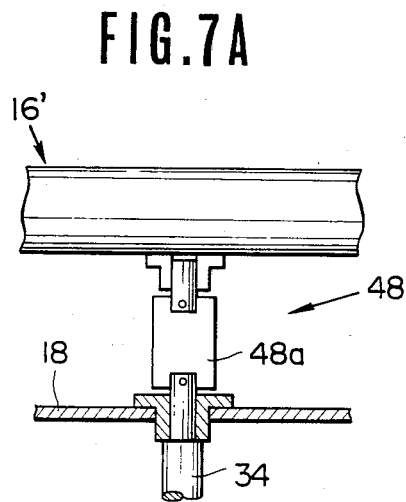
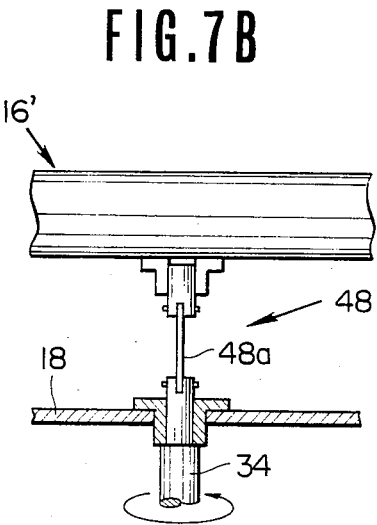
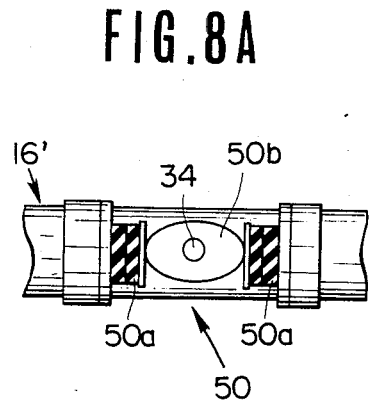
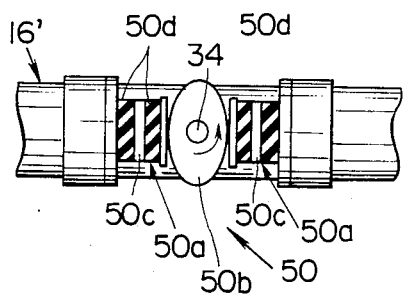

RACK AND PINION STEERING GEAR MOUNTING SYSTEM

BACKGROUND OF THE INVENTION

1. Field of the Invention

The present invention relates to mounting systems for road vehicle steering gears, particularly of the rack and pinion type.

2. Description of the Prior Art

A rack and pinion type steering gear includes a pinion adapted to be rotated by a manually operated steering wheel, a rack gear meshed with the pinion for lateral reciprocating motion and connected through side rods or tie rods to steerable vehicle wheels, and a gear housing accommodating movably therein the pinion and the rack and mounted on a vehicle chassis member such as for example a front suspension cross member through rubber insulators.

The insulators are desired to be less resilient or more rigid for making the steering gear more responsive and capable of giving a driver a feeling of "sharp" steering under vehicle low-speed running conditions. On the contrary, the insulators are desired to be more resilient or less rigid for damping of shocks caused by irregularities in the road surface and for making the steering gear less responsive under vehicle high-speed running conditions.

Such a dilemma is encountered in the prior art steering gear mounting. Various effors have been made to solve this problem but in vain.

SUMMARY OF THE INVENTION

In accordance with the present invention, there is provided a novel rack and pinion steering gear mounting system including a pinion, a rack meshed with the pinion and a gear housing enclosing movably therein the pinion and rack gear. The gear housing is mounted on a vehicle body member by clamp means and insulator means in such a manner that the gear housing is limitedly movable longitudinally thereof relative to the vehicle body member. Longitudinal movement of the gear housing is prevented by variable-resilience stopper means which are rotatable to have, with respect to a common force applied thereto, such a variable resilience that is maximum at a predetermined position of the stopper means, reduces in accordance with rotary movement of the stopper means in a predetermined direction out of the predetermined position, and is maximum at 90° of rotary movement of the stopper means from the predetermined position. Rotary movement of the stopper means is controlled by driving means in such a manner that the stopper means are held at or adjacent the predetermined position upon vehicle low-speed running conditions and rotated increasingly from the predetermined position as the speed of the vehicle increases and held at or adjacent 90° of rotary movement from the predetermined position upon vehicle high-speed running conditions.

With the above structure, the steering gear can be made more responsive to a desirable extent so as to be able to give a driver a feeling or "sharp" steering under vehicle low-speed running conditions and at the same time can be made less responsive so as not to give a driver a feeling of "sharp" steering and so as to attain good damping of shocks caused by irregularities in the road surface under vehicle high-speed running conditions.

It is accordingly an object of the present invention to provide a novel rack and pinion steering gear mounting system for a road vehicle which is free from the disadvantages and shortcomings inherent in the prior art arrangement.

It is a further object of the present invention to provide a novel rack and pinion steering gear mounting system of the aforementioned character which can contribute to improvements in a vehicle drivability and a vehicle riding comfort at the same time.

It is a further object of the present invention to provide a novel rack and pinion steering gear mounting system of the aforementioned character which can vary the responsiveness of the steering gear depending upon a vehicle speed.

It is a further object of the present invention to provide a novel rack and pinion steering gear mounting system of the aforementioned character which can attain good damping of shocks caused by irregularities in the road surface without deteriorating the drivability of the vehicle.

BRIEF DESCRIPTION OF THE DRAWINGS

The features and advantages of the rack and pinion steering gear mounting system according to the present invention will become more clearly appreciated from the following description taken in conjunction with the accompanying drawings, in which:

FIG. 1 is a partly sectional view of a prior art rack and pinion steering gear mounting;

FIG. 2 is a sectional view taken along the line II—II of FIG. 1;

FIGS. 6A and 6B are views similar to FIGS. 4 and 5 but showing a modified embodiment of the present invention;

FIGS. 7A and 7B are fragmentary sectional view showing another modification of the present invention;

FIGS. 8A and 8B are views similar to FIGS. 4 and 5 but showing a further modification of the present invention;

DESCRIPTION OF THE PREFERRED EMBODIMENTS

Figure 3:
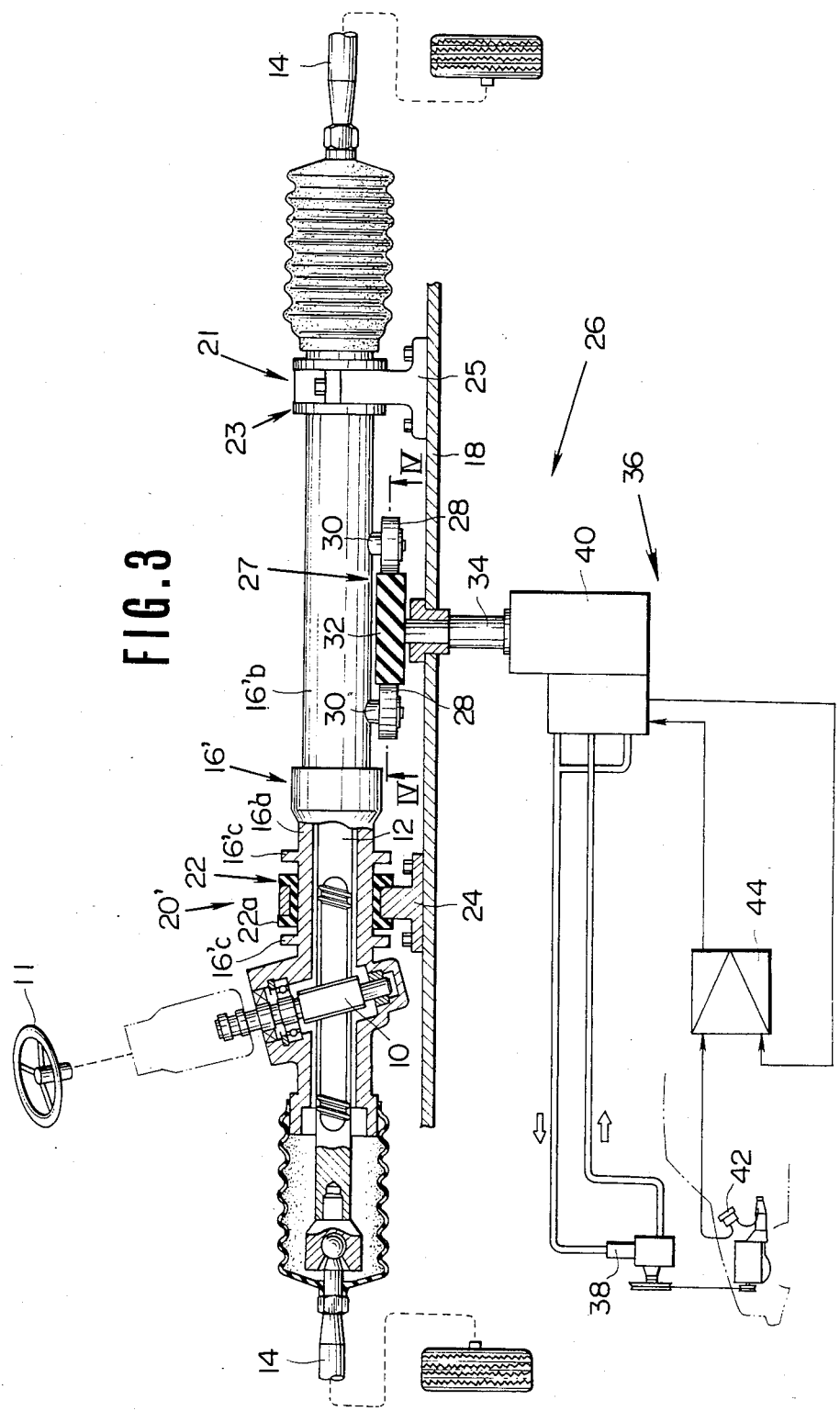
FIG. 3 is a schematic partly sectional view of a rack and pinion steering gear mounting system according to an embodiment of the present invention.

Referring to FIGS. 1 and 2, description is first made to a prior art steering gear mounting for a better understanding of the inventive step of the present invention.

In FIG. 1, a manual rack and pinion steering gear for an automotive vehicle is shown to include a pinion 10 connected to a manually operated steering wheel 11 of a vehicle to rotate together therewith and a rack gear 12 disposed to extend in a lateral direction of the vehicle and meshed with the pinion 10 for lateral reciprocating motion. The rack gear 12 is connected at the opposed ends thereof to side rods 14 which are in turn connected to steerable vehicle wheels 15. As is commonly known, rotation of the steering wheel 11 causes the pinion 10 to rotate and move the rack gear 12. The movement of the rack gear 12 turns the steerable vehicle wheels 15 about the generally vertical pivot axes thereof.

The rack gear 12 is disposed within a cylindrical gear housing 16 which also encloses and supports the pinion 10 in a rotatable manner. The gear housing 16 consists of a rack housing section 16a and a rack tube section 16b fixedly attached to the rack housing section 16a and is mounted on a vehicle body or chassis member 18 such as for example a front suspension cross member by means of a pair of mountings 20 and 21. Each mounting 20 or 21 consists of an annular rubber insulator 22 or 23 mounted on the gear housing 16 and a clamp 24 or 25 clamping the gear housing 16 by interposing therebetween the rubber insulator 22 or 23 and mounted on the vehicle body member 18. In order to prevent axial movement of the gear housing 16 relative to the vehicle chassis member 18 and at the same time to insulate the gear housing 16 from the vehicle chassis member 18 with respect to a force directed axially of the gear housing 16 as well as a force directed transversely of same, the gear housing 16 is formed with a pair of axially spaced flanges 16c while the rubber insulator 22 is formed at the opposed axial ends thereof flanges 22a which are clamped between the gear housing flanges 16c and the axially opposed ends of the clamp 24.

The insulators 22 are desired to be less resilient or more rigid for making the steering gear more responsive and capable of giving a driver a feeling of "sharp" steering under vehicle low-speed running conditions. On the contrary, the insulators 22 are desired to be more resilient or less rigid for damping of shocks caused by irregularities in the road surface and for making the steering gear less responsive under vehicle high-speed running conditions.

However, since the resilience or rigidity of the insulators 22 with respect to a given force applied thereto must be set to a certain value, it has been impossible to meet the above conflicting requirements at the same time. The prior art steering gear mounting has such a dilemma and inevitably results in deterioration in a vehicle drivability or a vehicle riding comfort or both.

Such problems and shortcomings of the prior art steering gear mounting can be overcome by the present invention which will be described hereinafter with reference to FIGS. 3 to 12 in which parts and portions like or corresponding to those of the prior art steering gear mounting of FIGS. 1 and 2 are designated by the same reference numerals as their corresponding parts and portions. Slightly modified parts and portions are designated by like reference numerals as their corresponding parts and portions, with prime marks added.

Figure 4:
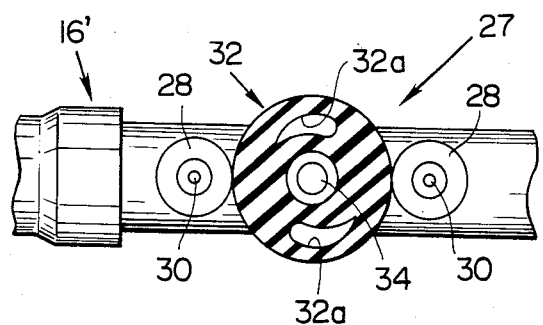
FIG. 4 is a sectional view taken along the line IV—IV of FIG. 3.
Figure 5:
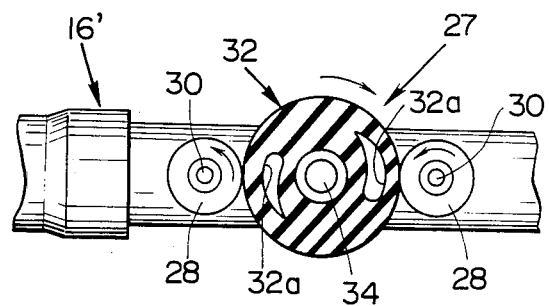
FIG. 5 is a view similar to FIG. 4 but showing a different operating condition.

In FIGS. 3 to 5, there is shown a rack and pinion steering gear mounting system according to an embodiment of the present invention.

The mounting system is generally designated by the reference numeral 26 and shown to comprise a variable-resilience stopper device 27. In this embodiment, the stopper device 27 is formed to comprise a pair of rollers 28 mounted on the gear housing 16' and spaced axially of same in a manner to be rotatable about vertical axes 30 or axes extending transverse of the gear housing 16'. The stopper device 27 also comprises a resilient disk member 32 interposed between the rollers 28 and mounted on the vehicle chassis member 18 in a manner to revolve on a vertical axis or an axis substantially in parallel with the axes 30 and in a manner to contact at the diametrically opposed peripheral portions thereof with the rollers 28, respectively.

As shown in FIGS. 4 and 5, the resilient disk member 32 is formed with a pair of axial openings 32a which are arcuated to locate on a common circle and diametrically opposed. The openings 32a have the same arcuated horn-like cross sectional shape and are formed to reduce in width from one end to the other in a predetermined direction of rotary movement of the disk member 32 (the counterclockwise direction of rotary movement in the drawing), that is, the openings 32a are formed so that the disk member 32 is caused by a force of the same magnitude to deform variably depending upon the variation of the portion of the disk member 32 on which the force is applied from one of the roller 28. More specifically, the disk member 32 is adapted to have, with respect to a force of the same magnitude applied thereto from one of the rollers 28, such a resilience that is maximum at a predetermined position of the disk member (the illustrated position in FIG. 4), reduces in accordance with rotary movement of the disk member 32 in a predetermined direction (the clockwise direction in the drawing) out of the predetermined position and is minimum at 90° of rotary movement of the disk member from the predetermined position.

The angular position of the disk member 32 is controlled by a driving unit 36 in accordance with a vehicle running condition. The driving unit 36 consists of a hydraulic pump 38, a hydraulic servomotor 40 hydraulically connected to the pump 38 and operative to produce a feedback signal representative of the magnitude of hydraulic power supplied thereto from the pump 38, a vehicle speed sensor 42 operative to detect a vehicle speed signal and produce a vehicle speed signal representative of a detected vehicle speed, and a control circuit 44 controlling hydraulic power to be supplied from the pump 38 to the servomotor 40 in dependence upon the vehicle speed signal and the feedback signal.

With the above driving unit 36, the disk member 32 is held at the position illustrated in FIG. 4, that is, a position where the openings 32a oppose along a line crossing the axis of the gear housing 16' at right angles when the vehicle is maintained at rest and is driven by the servomotor 40 to rotate increasingly in the aforementioned predetermined direction (the clockwise direction in FIG. 4) as the vehicle is started running and the vehicle speed increases. When the vehicle speed becomes equal to or higer than a predetermined value, the disk member 32 is rotated into the position illustrated in FIG. 5, that is, the position where the openings 32a oppose along the axis of the gear housing 16', and is maintained thereat.

The flanges 16'c of the gear housing 16' are formed to be spaced equally a predetermined distance from the corresponding flanges 22a of the insulator 22 so that the gear housing 16' is movable axially thereof until one of the flanges 16'c abuts upon the insulator 22. By this, resistance to axial movement of the gear housing 16' relative to the chassis member 18 is offered by the disk member 32 until one of the flanges 16'c abuts upon the insulator 22, that is, the disk member 32 is effective in damping of movements of the vehicle chassis member 18 relative to and axially of the gear housing 16'.

By the foregoing structure, the mounting system 26 of the present invention obtain a maximum resilience or minimum rigidity under vehicle low-speed running conditions since in that case the disk member 32 is held at or adjacent a position where the openings 32a oppose along a line crossing the axis of the gear housing 16' at right angles as shown in FIG. 4. By this, under vehicle low-speed running conditions, the steering gear can have a good responsiveness and can give a driver a feeling of "sharp" steering. When the vehicle is then put into high-speed running conditions, the vehicle speed sensor 42 detects the increase in vehicle speed and produce a vehicle speed signal indicative thereof in response to which the servomotor 40 is actuated to turn the disk member 32 into a position where the openings 32a oppose along the axis of the gear housing 16' as shown in FIG. 5 or into a position adjacent thereto. The mounting system 26 thus can obtain a minimum resilience or maximum rigidity under vehicle low-speed running conditions and a maximum resilience or minimum rigidity under vehicle high-speed running conditions. By this, the steering gear can be made less responsive so as not to give a driver a feeling of "sharp" steering under vehicle high-speed running conditions and can be efficient in damping of shocks caused by irregularities in the road surface under the same vehicle running conditions. The mounting system 26 of this invention thus can solve the aforementioned dilemma inherent in the prior art arrangement and can contribute to improvements in both a vehicle drivability and a vehicle riding comfort at the same time.

The flanges 16'c of the gear housing 16' are brought into abutment upon the insulator 22 when the gear housing 16' is subjected to axial forces that are too large to be absorbed by only the disk member 32 so that excessive deformation of the disk member 32 which may lead to breakage is prevented.

FIGS. 6A and 6B show a modified embodiment of the present invention. In this embodiment, a variable-resilience stopper device 46 is formed to comprise, in place of the disk member 32 in the previous embodiment, a rigid oval-shaped core member 46a mounted on the vehicle chassis member 18 in a manner to be rotatable with the axis 34 and a resilient circular cover member 46b having an oval-shaped opening 46c in which the rigid core member 46a is fitted and bonded thereto by an adhesive agent. By this, the assembly of the rigid oval-shaped core member 46a and the resilient cover member 46b can be less rigid or more resilient when subject to an external force at a thicker portion of the cover member 46b and more rigid or less resilient when subject to a force at a thinner portion of the cover member 46b. At the position illustrated in FIG. 6A, the assembly of the rigid core member 46a and the resilient cover member 46b can react against a force applied thereto from one of the rollers 28 with a minimum resilience or maximum rigidity and at the position illustrated in FIG. 6B with a maximum resilience or minimum rigidity. The variable-resilience stopper device 46 thus can produce substantially the same effect as that 27 of the previous embodiment.

FIGS. 7A and 7B show a further modification of the present invention. In this embodiment, a variable-resilience stopper device 48 is formed from a rectangular flat plate 48a having opposed ends at one end of which it is attached to the axis 34 to rotate therewith and at the other end rotatably mounted on the gear housing 16'. By this, the plate 48a can be less rigid or more resilient at a position tending to be bent in the direction of its thickness and more rigid or less resilient at a position tending to be bent in the direction of the width.

At the position illustrated in FIG. 7A, the resilient plate 48a can react against a force applied thereto from the gear housing 16' with a minimum resilience or maximum rigidity and at the position in FIG. 7B with a maximum resilience or minimum rigidity. The variable-resilience stopper device 48 thus can produce substantially the same effect as the devices 27 and 46 of the previous embodiments.

FIGS. 8A and 8B show a further modification of the present invention. In this embodiment, a variable-resilience stopper device 50 is formed to comprise a pair of resilient rectangular blocks 50a arranged to be spaced axially of the gear housing 16' and fixedly attached to same at the remoter ends thereof, and a rigid oval-shaped rotor 50b mounted on the vehicle chassis member 18 in a manner to rotate with the axis 34 and interposed between the resilient blocks 50a in a manner to contact the closer ends thereof. Each block 50a has a hollow section 50c sandwitched between solid sections 50d. The hollow section 50c is easily deformable or compressive so that the resilient block 50 has a stepwisely larger resilience or smaller rigidity during deformation of the hollow section 50c than during deformation of the solid sections 50d. When the oval-shaped rotor 50b is in contact at the peripheral portions coinciding with the longer axis ends thereof with the closer ends of the resilient rectangular blocks 50a as shown in FIG. 8A, the resilient rectangular blocks 50a are compressed to be shorter in length, i.e., the hollow section 50c are in a condition of being completely compressed, thus being less resilient or more rigid for further compression. On the contrary, when the oval-shaped rotor 50b is in contact at the periphral portions coinciding with the shorter axis ends thereof with the closer ends of the resilient rectangular blocks 50a as shown in FIG. 8B, the resilient rectangular blocks 50a are less compressed to be longer in length, i.e., the hollow sections 50c are in a condition of being slightly compressed, thus being more resilient or less rigid for further compression. At the position illustrated in FIG. 8A, the variable-resilience stopper device 50 thus can react against a force applied thereto from the gear housing 16' with a minimum resilience or maximum rigidity and at the position in FIG. 8B with a maximum resilience or minimum rigidity. The variable-resilience stopper device 50 thus can produce substantially the same effect as the devices 27, 46 and 48 of the previous embodiments.

Figure 9:
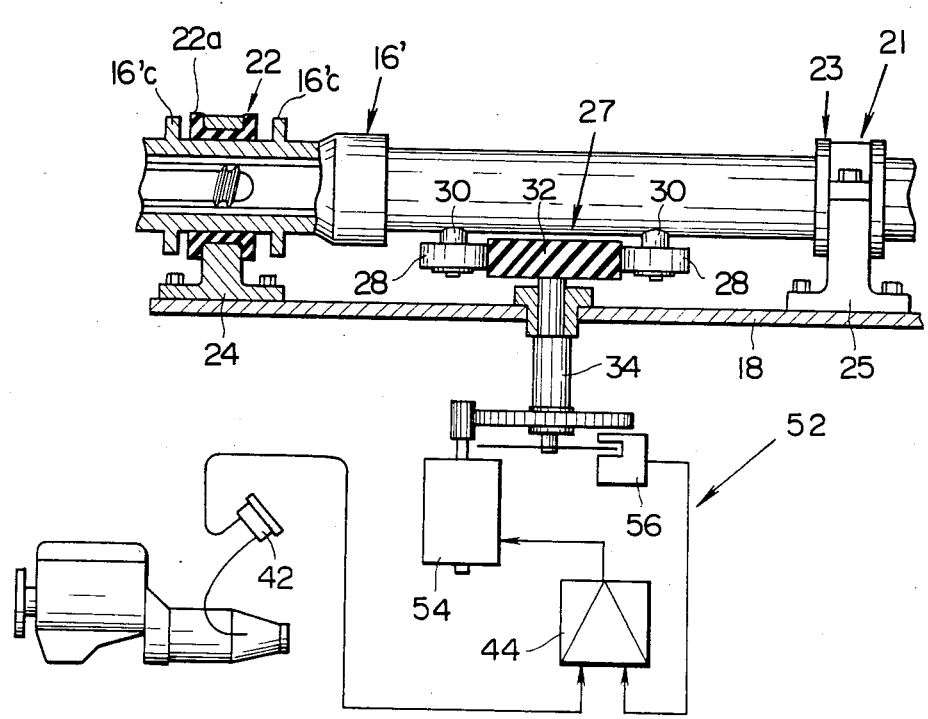
FIG. 9 is a schematic partly sectional view of a further modification of the present invention.

FIG. 9 shows a further modification of the present invention. In this embodiment, a driving unit 52 is formed to comprise an electric motor 54 drivingly coupled with the disk member 32 of the variable-resilience stopper device 27, in place of the hydraulic servomotor 40 in the embodiment of FIG. 3, and an angular position sensor 56 operative to detect an angular position of the disk member 32 and produce an angular position signal representative of a detected angular position. The control circuit 44 controls energization of the electric motor 54 in dependence upon the angular position signal applied thereto from the angular position sensor 56 and the vehicle speed signal applied thereto from the vehicle speed sensor 42. The driving unit 52 can produce substantially the same effect as that 36 of the previous embodiment of FIG. 3.

Figure 10:
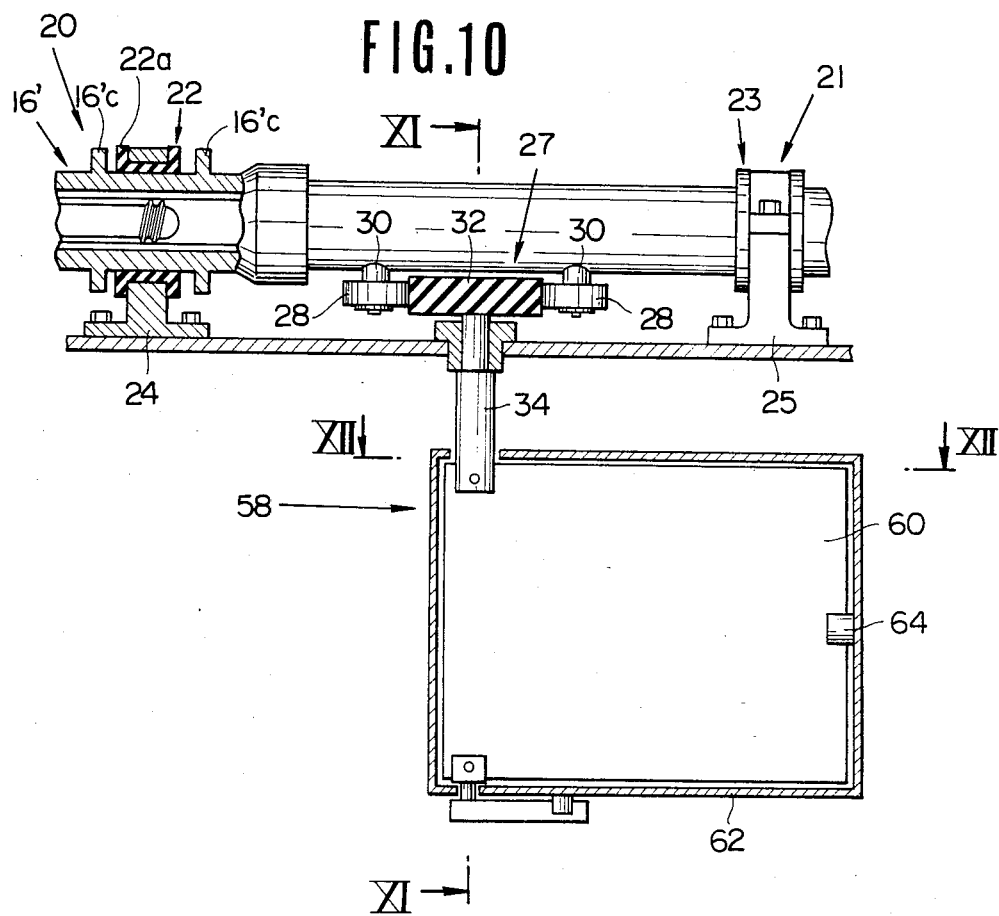
FIG. 10 is a schematic partly sectional view of a further modification of the present invention.
Figure 11:
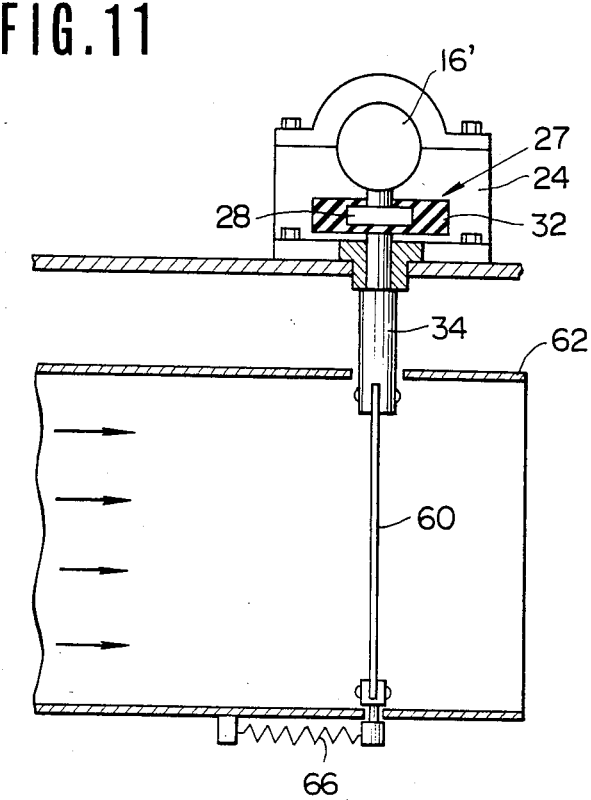
FIG. 11 is a sectional view taken along the line XI—XI of FIG. 10.
Figure 12:
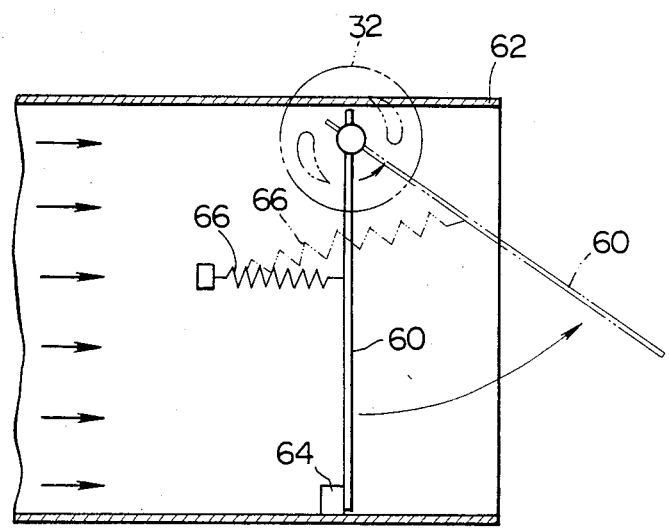
FIG. 12 is a sectional view taken along the line XII—XII of FIG. 10.

FIGS. 10 to 12 show a further modification of the present invention. In this embodiment, a driving unit 58 is adapted to comprise a wind receiving plate 60 swingable together with the axis 34 in response to a pressure of wind flowing there against a upon travelling of the vehicle. The wind receiving plate 60 is swingably disposed within an air duct 62 having an inlet at the front end of the vehicle (not shown) and directing collected wind toward the wind receiving plate 60. The driving unit 58 also comprises a stopper 64 which is attached to the air duct 62 and with which the wind receiving plate 60 is held in contact when a vehicle is in a standstill condition, and a spring 66 urging the wind receiving plate 60 against the stopper 64.

With the above driving unit 58, the wind receiving plate 60 is held in contact with the stopper 64 under the bias of the spring 66 as shown by solid line in FIG. 11 under vehicle low-speed running conditions since the wind pressure acting on the wind receiving plate 60 is smaller than the bias of the spring 66. As the speed of the vehicle increases, the wind receiving plate 60 is caused to swing increasingly together with the axis 34 and therefore with the disk member 32 against the bias of the spring 66 as shown by phantom line in FIG. 12. With the driving unit 58, the variable-resilience reaction device 32 can be rotated in the manner similar to the previous embodiment of FIG. 3 in accordance with variation of the vehicle speed.

What is claimed is:

1. A rack and pinion steering gear mounting system for a road vehicle, comprising:
    a pinion rotatable with a manually operated steering wheel;
    a rack gear meshed with said pinion for reciprocating motion longitudinally thereof for turning steerable vehicle wheels;
    a gear housing enclosing movably therein and supporting said pinion and said rack and elongated axially of said rack gear;
    a vehicle body member extending along said gear housing;
    clamp means for mounting said gear housing on said vehicle body member in such a manner that the gear housing is limitedly movable longitudinally thereof relative to said vehicle body member;
    insulator means interposed between said clamp means and said gear housing for damping of relative movements between said clamp means and said gear housing toward and away from each other;
    variable-resilience stopper means for preventing longitudinal movement of said gear housing relative to said vehicle body member, said stopper means being rotatable to have, with respect to a force of the same magnitude applied thereto, such a variable resilience that is minimum at a predetermined position of said stopper means, reduces in accordance with rotary movement of said stopper means in a predetermined direction out of said predetermined position, and is maximum at 90° of rotary movement of said stopper means from said predetermined position; and
    driving means for driving said stopper means in such a manner that said stopper means are held at or adjacent said predetermined position upon low-speed running conditions of the vehicle and rotated increasingly from said predetermined position as the speed of the vehicle increases and held at or adjacent 90° of rotary movement from said predetermined position upon high-speed running conditions.

2. A rack and pinion steering gear mounting system as set forth in claim 1, in which said variable-resilience stopper means comprise a pair of rollers mounted on said gear housing and spaced axially of same in a manner to be rotatable about axes extending transversely of said gear housing, and a resilient disk member interposed between said rollers and mounted on said vehicle body member in a manner to be rotatable about an axis substantially in parallel with said axes of said rollers and in a manner to contact at the diametrically opposed outer peripheral portions thereof with said rollers, respectively, said disk member being formed to have a pair of axial openings which are arcuated to locate on a common circle and diametrically opposed, said openings having the same arcuated horn-like cross sectional shape and being formed to reduce in width from one end to the other in a predetermined direction of rotary movement of said disk member coinciding with said predetermined direction of rotary movement of said stopper means.

3. A rack and pinion steering gear mounting system as set forth in claim 1, in which said variable-resilience stopper means comprise a pair of rollers mounted on said gear housing and spaced axially of same in a manner to be rotatable about axes extending transversely of said gear housing, a rigid oval-shaped core member mounted on said vehicle body member in a manner to be rotatable about an axis substantially in parallel with said axes of said rollers, and a resilient circular cover member having an oval-shaped opening, fitted on said rigid core member and arranged to contact at the diametrically opposed outer peripheral portions thereof with said rollers.

4. A rack and pinion steering gear mounting system as set forth in claim 1, in which said variable-resilience stopper means comprise a resilient flat plate mounted at on end on said gear housing and at the other end on said vehicle body member in a manner to be rotatable about an axis extending transversely of said gear housing.

5. A rack and pinion steering gear mounting system as set forth in claim 1, in which said variable-resilience stopper means comprise a pair of resilient rectangular blocks arranged to be spaced axially of said gear housing and fixedly attached to same at the remoter ends thereof, and a rigid oval-shaped rotor mounted on said vehicle body member in a manner to be rotatable about an axis extending transversely of said gear housing and interposed between said resilient blocks in a manner to contact at the diametrically opposed peripheral portions thereof with the closer ends of said blocks.

6. A rack and pinion steering gear mounting system as set forth in claim 5, in which each of said resilient blocks has a hollow section sandwitched between solid sections so that it has a stepwisely larger resilience during deformation of said hollow section than during deformation of said solid sections.

7. A rack and pinion steering gear mounting system as set forth in claim 1, in which said insulators comprise a pair of annular rubber insulators one of which has opposed flanged ends, and said clamp means comprise a pair of flanges provided to said gear housing in a manner to be spaced axially of same, said one rubber insulator being disposed between said gear housing flanges in a manner to have said rubber insulator flanged ends spaced equally a predetermined distance from said gear housing flanges, said clamp means also comprising a pair of clamps clamping said gear housing by interposing therebetween said rubber insulators and mounted on said vehicle body member.

8. A rack and pinion steering gear mounting system as set forth in claim 1, in which said driving means comprise a hydraulic pump, a hydraulic servomotor hydraulically connected to said pump and operative to produce a feedback signal representative of the magnitude of hydraulic power supplied thereto from said pump said servomotor being drivingly coupled with said variable-resilience stopper means, a vehicle speed sensor operative to detect a vehicle speed and produce a vehicle speed signal representative of a detected vehicle speed, and a control circuit controlling hydraulic power supplied from said pump to said servomotor in dependence upon said vehicle speed signal and said feedback signal.

9. A rack and pinion steering gear mounting system as set forth in claim 1, in which said driving means comprise an electric motor drivingly coupled with said variable-resilience stopper means, an angular position sensor operative to detect an angular position of said variable-resilience stopper means and operative to produce an angular position signal representative of a detected angular position of said stopper means, a variable speed sensor operative to detect a vehicle speed and produce a vehicle speed signal representative of a detected vehicle speed, and a control circuit controlling energization of said electric motor in dependence upon said angular position signal and said vehicle speed signal.

10. A rack and pinion steering gear mounting system as set forth in claim 1, in which said driving means comprise a wind receiving plate drivingly coupled with said variable-resilience stopper means to rotate together therewith, an air duct accommodating movably therein said wind receiving plate and formed to collect wind arising upon running of the vehicle and to direct collected wind toward said wind receiving plate, a stopper provided to said air duct and arranged in such a manner that said wind receiving plate abuts upon said stopper when said variable-resilience stopper means assume said predetermined position, and a spring urging said wind receiving plate against said stopper.

* * * * *